Dec. 10, 1968  J. W. O'BRIEN  3,415,148
SCRAP CUTTING SHEAR AND IMPROVED KNIFEHEAD
Filed June 6, 1966  2 Sheets-Sheet 1
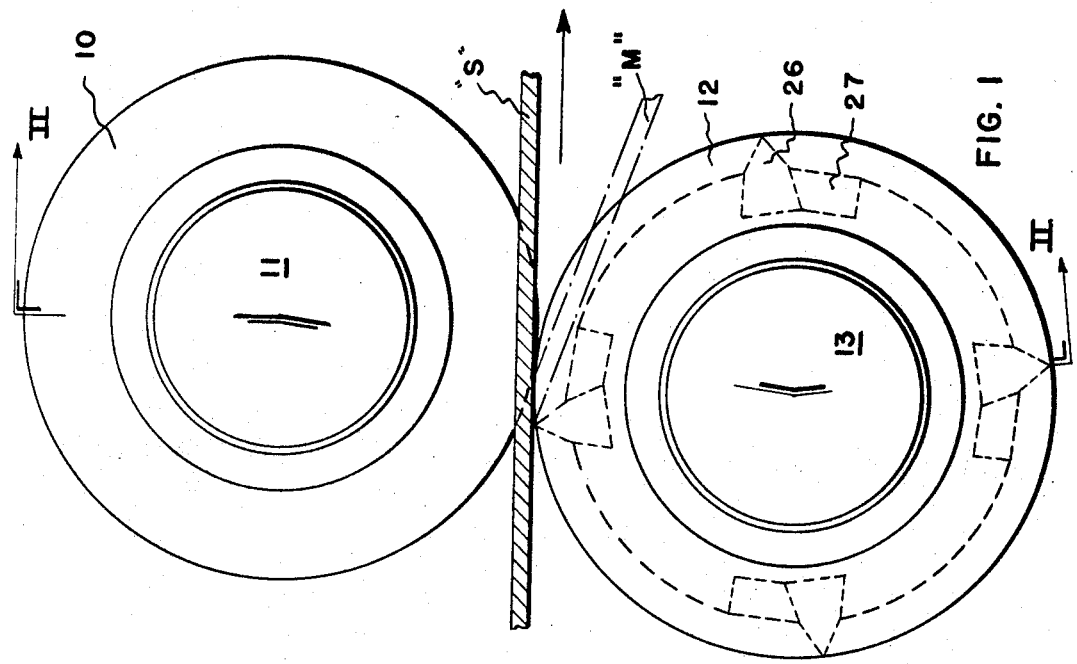
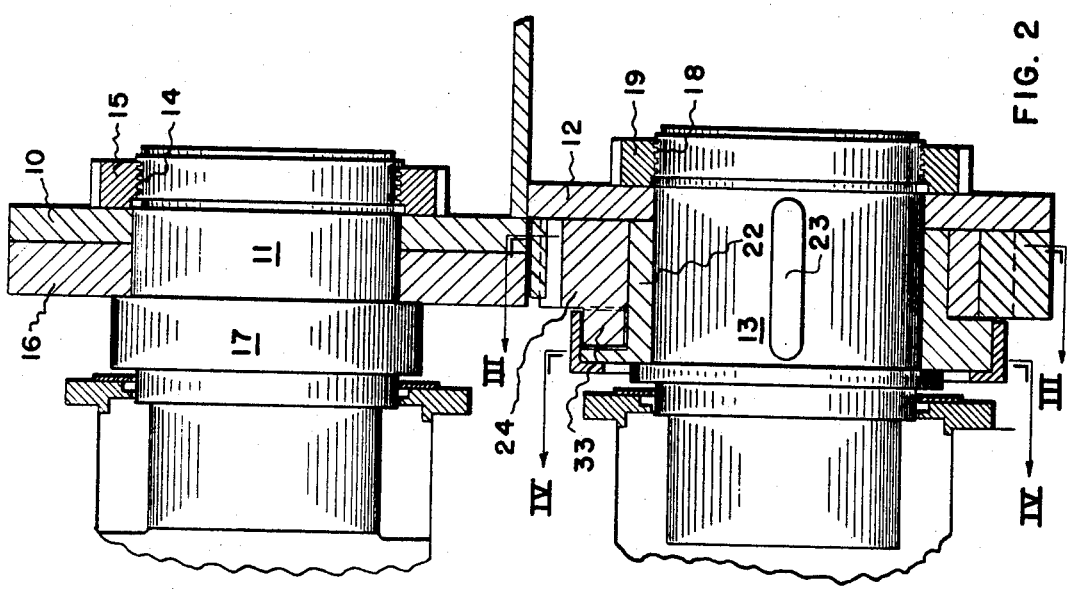
INVENTOR.
JEREMIAH W. O'BRIEN
BY
HIS ATTORNEY Dec. 10, 1968  J. W. O'BRIEN  3,415,148
SCRAP CUTTING SHEAR AND IMPROVED KNIFEHEAD
Filed June 6, 1966  2 Sheets-Sheet 2

INVENTOR.
JEREMIAH W. O'BRIEN
BY
HIS ATTORNEY

United States Patent Office 3,415,148
Patented Dec. 10, 1968

3,415,148
SCRAP CUTTING SHEAR AND IMPROVED KNIFEHEAD
Jeremiah Wagner O'Brien, Pittsburgh, Pa., assignor to United Engineering and Foundry Company, Pittsburgh, Pa., a corporation of Pennsylvania
Filed June 6, 1966, Ser. No. 556,810
Claims priority, application Great Britain, June 14, 1965, 25,135/65
4 Claims. (Cl. 83—302)

ABSTRACT OF THE DISCLOSURE

The present disclosure relates to a combined side trimming and scrap chopper shear of the type employed to trim the marginal edge from a metallic strip as it is passed through the shear and, at the same time, cut into short lengths the sheared marginal edge. The shear includes a star-type scrap chopper knife which is mounted on an arbor and adapted to be rotated into and out of a shearing position. To allow penetration of the knife, an anvil member is provided which serves as a backing for the knife during the cutting period. In order to allow for limited relative movement between the knife and arbor a ring is provided between the arbor and knife for driving the knife. The actual driving of the knife takes place by means of a projection that interconnects the knife and ring through means of an extendable backing member made out of rubber.

---

This invention relates to a rotary type side trimming shear for strip-like material and, more particularly, to a side trimming shear having scrap chopper knives mounted on the same arbor that carries the side trimming knife. A shear of this type is illustrated in U.S. Patent No. 2,203,738 which issued to L. W. Nash on June 11, 1940.

As the above patent shows, the arbor that supports one of the side trimming knives is provided with a number of spaced-apart scrap knives that cooperate with a ring carried by the arbor of the opposed side trimming knife. The arrangement is such that on the rotation of the arbor the scrap chopper knives are brought into a cutting relationship with the trimmed marginal edge of the strip and cut it into short lengths, the lengths being determined by the distance between the scrap chopper knives.

In the operation of such a side trimming shear, the linear velocity of the strip is controlled by the angular velocity of the side trimming knives which is normally constant. The velocity of the scrap chopper knives, however, is not the same at the instant of cut. The scrap chopper knives, while they have the same diameter as the side trimming knives and, hence, have the same velocity when actually perpendicular to the strip, their velocities are something less than the velocity of the side trimming knives when they are approaching the strip to effect a cut, i.e., the strip is passing on a horizontal plane of travel but when the scrap knives first engage the strip they are moving angularly relative to the horizontal plane of travel of the strip. At this point, the strip passing through the side trimming knives is pulled by the scrap knives, which action results in objectionable marking of the edge of the strip being trimmed. This is particularly true in shearing relatively thick strip-like material.

It is an object of the present invention to eliminate the marking caused by the above-described condition.

More specifically, the present invention provides in a side trimming shear of the above type, an arbor for carrying and driving the side trimming knives and the scrap knives, means for connecting said scrap knives to said arbor in a manner to permit relative motion between the scrap knives and the trimming knives during the period the scrap knives are in contact with the marginal trimmed portion of the material.

In a particular arrangement, the present invention provides a pair of opposed arbors on each of which there is mounted in cooperative cutting relationship a side trimming knife, one of said arbors carrying an annular holder on which there is mounted a number of scrap knives, said scrap knives cooperating with a ring mounted on the opposed arbor to sever the trimmed marginal portion from the strip, a driving collar carried by the arbor of said scrap knives having a number of recesses equal to the number of scrap knives, said collar being driven by said arbor, driving projections formed on said holder received in said recesses of said collar, yieldable means received in said recesses on at least one side of each of said projections in engagement with the projection of said knife holder, the construction being such that said scrap knives are allowed to move relative to their arbor against the resiliency of said yieldable means.

These objects, as well as other features of the present invention, will be more readily understood when the following description is read in light of the accompanying drawings of which:

FIGURE 1 is a schematic elevational view of one side of a side trimming shear for trimming one edge of a strip and which incorporates the features of the present invention;

FIGURE 2 is an elevational sectional view taken on lines II—II of FIGURE 1;

Figure 3:
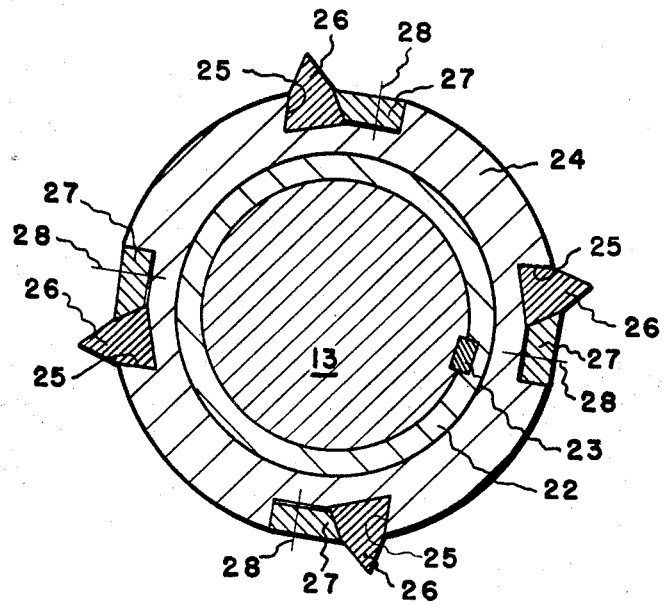
FIGURE 3 is a sectional view taken on lines III—III of FIGURE 2.

With reference to the drawings, there is shown an upper side trimming knife 10 mounted on an arbor 11 which cooperates with a lower side trimming knife 12 mounted on a second arbor 13. The two arbors are offset relative to a horizontal place which urges the marginal trimmed portions downwardly away from the trimmed strip. FIGURE 1 also illustrates a strip S being fed into the knives 10 and 12 in a direction shown by the arrow and illustrates a position M which represents the marginal trimmed portion which has been sheared from the strip on one side thereof.

FIGURE 2 shows in better detail the actual mounting of the knives 10 and 12. The arbor 11 is provided with threads 14 at its front end which receives a nut 15 engaging the interface of the upper trimming knife 10. The knife 10 is backed up by a ring 16 received on the arbor 11 which has a collared portion 17 for providing a support for the inner surface of the supporting ring 16.

The lower arbor 13 is also provided with a series of threads 18 for receiving a nut 19 that engages an interface of the side trimming knife 12. On the opposite side of the side trimming knife 12 there is provided a sleeve 22 which is keyed to the arbor by a key 23. The sleeve 22 carries a ring 24 which actually is a holder for the scrap chopper knives. Thus, as shown in FIGURE 3, on the ring 24 there are provided four recesses 25 into which there are received four scrap chopper knives 26, each knife being backed in one direction by an insert metal block 27 which has a tapered surface for forcing the knife against the adjacent surface of the ring. Bolts 28 are provided for holding the blocks 27 in their operative holding positions.

Figure 4:
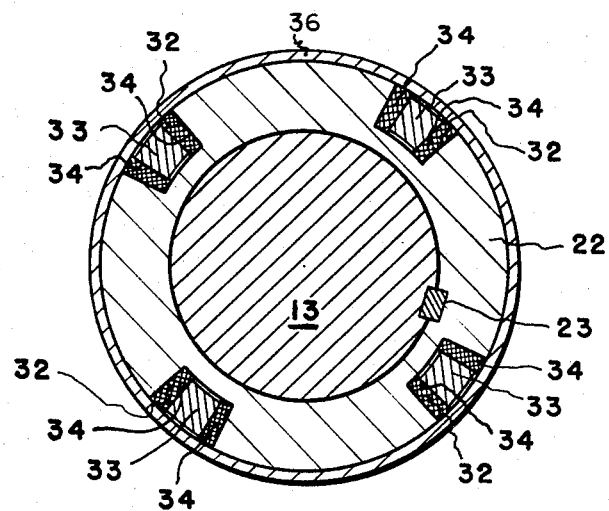
FIGURE 4 is a sectional view taken on lines IV—IV of FIGURE 2.

Turning again to the sleeve 22, reference is made to FIGURE 4, where it will be seen that the sleeve towards its inner end is provided with a number of recesses 32 arranged on the 90° radians of the arbor. As FIGURE 2 illustrates, the ring 24 for the scrap knives is provided with rearwardly projecting driving portions 33 which fit into the recesses 32 of the sleeve 22. The cross-sectional thickness of the driving projections 33 with reference to the width of the recesses 32 are such as to provide spacing between the sleeve and the two adjacent surfaces of the projection. Into these recesses on both sides of the projections 33, as FIGURE 4 shows, there are provided yieldable inserts 34, such as rubber or the like, which are wedge shaped and which resist the movement of the ring 24 and, hence, the scrap knives 26. Radially outward of the recesses 32 there is provided an encasement ring 36 which retains the inserts 34 in the recesses.

In operation, when one of the scrap knives 26 approaches the cutting zone and engages the material as illustrated in FIGURE 1, as previously noted, the horizontal velocity of the knife will be something less than the horizontal velocity of the strip passing through the side trimming knives 10 and 12 which velocity is controlled by the knives 10 and 12. When this occurs, the knives will provide a torsional force on the ring 24 which will work back through its projections 33 and engage the yieldable inserts 34 which will allow the ring to move relative to the sleeve 22 and the arbor 13. This yielding will avoid the knife 26 trying to retard the movement of the strip and, thus, avoid the tendency to mark caused by this condition. As the knives 26 approach the perpendicular position with respect to the strip and at the same time match its speed, they will be in position to effect a cut of the marginal trimmed portion in cooperation with the ring 16 and the side trimming knife 10.

It will be appreciated that various forms of the present invention can be used without departing from its scope. For example, the recesses 32 can be formed on the ring 24 and the projections 33 on the sleeve 22 with the insert 34 being carried by the ring 24.

In accordance with the patent statutes, I have explained the principle and operation of my invention and have illustrated and described what I consider to represent the best embodiments thereof. However, I desire to have it understood that within the scope of the appended claims, the invention may be practiced otherwise than as specifically illustrated and described.

I claim:
1. In a knifehead assembly for use in a shear for severing strip-like material, comprising:
   a rotatable arbor for carrying a knife which is adapted to be brought into a shearing relationship with one surface of the material to be severed,
   a ring supported by said arbor and arranged between the arbor and the knife for supporting said knife and being driven by said arbor,
   said ring having a portion serving to drive said knife, and
   a yieldable means arranged to engage said ring portion and said knife to permit limited relative rotational movement between said ring and knife during the driving action.

2. In a knifehead assembly according to claim 1, wherein said knife comprises a number of circumferentially spaced knife elements, a driving element including a number of members, said ring having drivable surfaces engageable by said members of said driving element, said drivable surfaces being formed by a plurality of recesses formed in said ring,
   said members comprising projections, shaped complementary to said recesses and extending into said recesses, and
   said yieldable means being arranged in said recesses and between the ring and said projections.

3. In a knifehead assembly according to claim 2, wherein said yieldable means are arranged on both sides of said projections.

4. In a side trimming shear for severing the marginal edges from strip-like material comprising,
   first and second spaced-apart arbors, each adapted to rotatably support cooperative disc-shaped side trimming knives, said knives being axially offset to thereby form a shearing zone,
   a backup disc rotatably carried by one of said arbors and arranged immediately behind the side trimming knife thereof,
   said backup disc and the adjacent side trimming knife forming a straight surface approximately equal to the width of the marginal edge to be served,
   a ring mounted on the other arbor having a width sufficiently equal to the surface formed by said backup disc and its cooperative side trimming knife,
   a plurality of scrap chopping knives carried by said ring wherein on rotation the trimmed marginal edge of the strip is successively shearing between said surface and said scrap chopping knives,
   a second ring mounted on said other arbor and between said first ring and the arbor, and being drivenly associated with said arbor,
   said second ring, including a driving element associated with said first ring so as to impart the driving torque of said arbor to said first ring, and
   yieldable means arranged between said driving element and said first ring allowing limited relative circumferential movement between said first and second rings.

References Cited

UNITED STATES PATENTS 3,110,208  11/1963  Mitchell et al. _____ 83—302
3,151,513  10/1964  Rowlands _____ 83—348 X ANDREW R. JUHASZ, *Primary Examiner.*

U.S. Cl. X.R.

83—348, 674, 923